United States Patent
Oz et al.

(10) Patent No.: US 7,451,475 B1
(45) Date of Patent: Nov. 11, 2008

(54) METHOD FOR DELIVERY OF NARROW-CAST DATA OVER DIGITAL BROADCAST CHANNELS

(75) Inventors: Ran M. Oz, Modiin (IL); Zeev Vax, Tel Aviv (IL)

(73) Assignee: Big Band Networks Inc

( * ) Notice: Subject to any disclaimer, the term of this patent is extended or adjusted under 35 U.S.C. 154(b) by 809 days.

(21) Appl. No.: 09/595,624

(22) Filed: Jun. 16, 2000

Related U.S. Application Data

(60) Provisional application No. 60/188,489, filed on Mar. 10, 2000, provisional application No. 60/188,486, filed on Mar. 10, 2000, provisional application No. 60/153,347, filed on Sep. 10, 1999, provisional application No. 60/139,649, filed on Jun. 17, 1999.

(51) Int. Cl.
*H04N 7/173* (2006.01)

(52) U.S. Cl. .................. 725/127; 725/95; 725/119

(58) Field of Classification Search .............. 370/389, 370/392, 394, 486, 535, 426–427, 419–420, 370/538–540, 351–353, 355, 422, 395.52, 370/443; 725/91, 92, 93, 94, 95, 114, 115, 725/116, 117–120, 109–110, 127; 709/226–228
See application file for complete search history.

(56) References Cited

U.S. PATENT DOCUMENTS

| 5,481,542 | A |  | 1/1996 | Logston et al. |  |
|---|---|---|---|---|---|
| 5,548,532 | A |  | 8/1996 | Menand et al. |  |
| 5,742,623 | A |  | 4/1998 | Nuber et al. |  |
| 5,850,218 | A | * | 12/1998 | LaJoie et al. | 725/45 |
| 6,130,898 | A | * | 10/2000 | Kostreski et al. | 370/522 |
| 6,305,020 | B1 | * | 10/2001 | Hoarty et al. | 725/95 |
| 6,324,267 | B1 | * | 11/2001 | Hraster et al. | 379/93.02 |
| 6,484,318 | B1 | * | 11/2002 | Shioda et al. | 725/110 |
| 6,530,086 | B1 | * | 3/2003 | Brodigan | 725/95 |
| 6,681,393 | B1 | * | 1/2004 | Bauminger et al. | 725/23 |
| 6,732,179 | B1 | * | 5/2004 | Brown et al. | 709/229 |
| 6,928,656 | B1 | * | 8/2005 | Addington | 725/111 |
| 2002/0007492 | A1 | * | 1/2002 | Smyth et al. | 725/107 |

FOREIGN PATENT DOCUMENTS

| EP | 0526104 A2 | 7/1992 |
|---|---|---|
| EP | 0526104 A3 | 7/1992 |
| EP | 0692914 A2 | 1/1996 |
| EP | 0692914 A3 | 1/1996 |
| WO | WO 98/00975 | 1/1998 |

OTHER PUBLICATIONS

The International Search Report, Jul. 30, 2001.
Lee Goldberg, "MCNS/DOCSIS MAC Clears A Path For The Cable-Modem Invasion", Electronic Design, US, Penton Publishing, p. 69-70, 74, 78, 80, vol. 45, No. 27, Dec. 1, 1997.

* cited by examiner

*Primary Examiner*—Ngoc K Vu
(74) *Attorney, Agent, or Firm*—Reches Patents

(57) ABSTRACT

Broadband multimedia system comprising a communication bus, a broad band multimedia router, connected to the communication bus, to a data router and further between a plurality of media sources and a plurality of network transmitters, a session manager, connected to communication bus, the session manager providing routing instructions to the router, for directing media received from the media sources to the network transmitters for transmitting over a broadband network and for directing data received from the router to at least a selected one of the network transmitter for transmitting over the broadband network to a specific destination.

6 Claims, 10 Drawing Sheets

METHOD FOR DELIVERY OF NARROW-CAST DATA OVER DIGITAL BROADCAST CHANNELS

CROSS REFERENCE TO RELATED CASES

This claims priority to and the benefit of each of the following U.S. Provisional applications; Ser. No. 60/139,649, filed Jun. 17, 1999; Ser. No. 60/153,347, filed Sep. 10, 1999; Ser. No. 60/188,489 filed Mar. 10, 2000; and Ser. No. 60/188,486 filed Mar. 10, 2000.

FIELD OF THE INVENTION

The present invention relates to communication systems in general, and to methods and systems for establishing multimedia communication, in particular.

BACKGROUND OF THE INVENTION

Broadband communication systems are known in the art. The main types include video oriented communication systems and data oriented communication systems. Video oriented communication systems were originally designed for television broadcast transmissions and today include modifications, which enable narrow-cast transmissions as well as data communications there through. Data oriented communication systems are used for a plurality of data and multimedia applications. Conventionally, downstream channels (from the cable service operator to the end user) are used to carry either only IP packets (using for example) or only native MPEG programs over MPEG transport. This requires the cable operator to perform fixed allocation of downstream resources for different services, which limits the resource usage efficiency, especially for the downstream bandwidth.

Cable Modem Termination Systems (CMTS) are known in the art. Such systems are installed in a cable head-end and are connected to a plurality (conventionally thousands) of Cable Modems (CM) via a Hybrid Fiber/Coaxial (HFC) Network. A conventional single CMTS board transmits downstream information on a single channel and receives upstream information from one or more (usually not more than 8) upstream channels. Upstream channels which are connected to a single CMTS board, can be received from many nodes (usually for areas which are characterized by a small number of cable modem users) or from a single node (usually for areas which are characterized by a large number of cable modem users).

The operation of a conventional CMTS is generally pre-defined, where the cable modem users are configured to utilize a specific CMTS downstream channel. Each CMTS downstream channel has specific associated upstream channels. The CMTS board uses its associated downstream channel, to provide upstream channels and time slot information to the CMs on which they can transmit information back to the head-end, at any given time.

An article, "Multimedia Traffic Engineering for HFC Networks" by John T. Chapman from Cisco Systems (Nov. 29, 1999), discusses possible CMTS architectures contingent on penetration of CMs and broadband services.

Digital video and other media are typically transmitted in a compressed form, encapsulated in MPEG transport packets, which include information associating them to a specific stream. In general, digital transmission dramatically increases the potential network capacity. Ten to twenty digital video channels can be transmitted using a communication channel. Digital transmission further provides data transmission, using and MPEG transport.

New generations of set top boxes (STB's) includes two downstream tuners, one for video, one for data (e.g., these STBs are equipped with a cable modem). A WebTV set-top box manufactured and sold by Microsoft, allows the viewer to watch television programs while receiving data from a dedicated telephone line, using a dial-up modem connection.

The ability to transmit video and data combined together leads to a new class of applications, which are classified under Interactive TV (or sometime referred too as Enhanced TV). An Interactive TV application can be categorized into three main application types, each of which with different capabilities and technical challenges.

The first type includes personalized data applications transmitted to the set top box (STB) of the end user, such as WEB surfing and Email application on the TV screen. These applications use the STB processing capabilities, to bring basic Internet services to TV viewers with no use of computers.

The second type includes applications for transmitting narrow-cast video with data. The ability to combine data into a video on demand (VOD) session enable application that can let the user see additional information regarding the movie (e.g., actors names, directors and the like) by adding a link to the appropriate WEB site. Enabling such URL links provides a VOD system to add links to sites with products that are related to the movie and enables the user buy these products while watching the movie.

The third type includes application for transmitting narrow-cast data and broadcast video to same viewer, where, the narrow-cast data can be related or unrelated to the video program watched by the viewer.

For set-top devices that have two different paths one for video and one for data, these applications are very trivial to implement. (e.g., a WebTV box with telephone connection, or a digital STB with a DOCSIS cable modem inside).

This invention enabled the same 3 applications mentioned above on a digital STB which have only a single 6 MHz downstream tuner, where narrow-cast data is submitted In-Band (with the video programs either broadcast or on-demand). In this case, these applications are enabled by a unique headend device that can take all broadcast feeds, and grooms all program in a way that there is some bandwidth left on each channel for narrow-cast data delivery (e.g., 2-3M/bit sec in average). This device knows how to send the narrow-cast data to a specific viewer on the same channel the viewer's STB is currently tuned to. If the viewer's STB switched to a different channel, the headend device will know to redirect the viewer's narrow-cast data to the new channel.

SUMMARY OF THE PRESENT INVENTION

It is an object of the present invention to provide a novel method and system for delivery of narrow-cast data over digital broadcast channels, which overcomes the disadvantages of the prior art.

In accordance with the present invention, there is thus provided a method for transmitting data over a broadband networks having a plurality of downstream channels and an upstream channel, the method includes the steps of:

receiving an upstream data packet from a broadband end-user unit, via the upstream channel, directing the upstream data packet to an addressable destination, designated in the upstream data packet, receiving a downstream data packet from the addressable destination, converting the downstream data packet for conveying in a selected one of the downstream channels, thereby producing transport packets, and directing the transport packets to the broadband end-user unit, via the selected downstream channel.

In accordance with another aspect of the invention, there is thus provided a method for transmitting data packets over media transport channels, to a remote unit, where the remote unit is associated with a destination address embedded in the data packets. The method includes the steps of: establishing a data session over a selected media transport channel, allocating logical media resources over the media transport channel for the data session, converting the data packets to data transport packets embedding the allocated logical media resources, according to a media transport specification, and, transmitting the media transport packets via the selected media transport channel.

In accordance with a further aspect of the invention, there is thus provided a method for synchronizing between a data session including a plurality of data packets, and a media session including a plurality of media packets, over media transport channels. The method includes the steps of: converting the data packets in to data transport packets according to a media transport specification, converting the media packets into media transport packets according to the media transport specification, assigning identical time stamp to selected transport packet pairs. Each the transport packet pairs includes a selected data transport packet and a selected media transport packet.

In accordance with another aspect of the invention, there is thus provided a broadband multimedia system including a communication bus, a broad band multimedia router, connected to the communication bus, to a data router and further between a plurality of media sources and a plurality of network transmitters and a session manager, connected to communication bus. The session manager provides routing instructions to the router, for directing media received from the media sources to the network transmitters for transmitting over a broadband network and for directing data received from the router to at least a selected one of the network transmitter for transmitting over the broadband network to a specific destination.

In accordance with a further aspect of the invention, there is thus provided a session manager and IP soft switch. The session manager and IP soft switch is connected to a broadband multimedia router. The session manager and IP soft switch receives downstream data session requests to a selected broadband network destination. The session manager and IP soft switch allocates network resources for the data session for transmitting over the broadband network to the broadband network destination.

In accordance with a further aspect of the invention, there is thus provided a method for controlling the transmission rate of data packets, which are to be transmitted on media transport channel. The method includes the steps of: receiving a plurality of data packets, storing the data packets in a flow queue, releasing the data packets from the flow queue at a predetermined rate, and converting the released data packets to transport packets.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a novel method and system, which utilize different layer-two solutions for the upstream and downstream directions, and by providing a system and a method, which unifies different media sources over selected media transport channels, in a manner which is seamless to the end user, and in most cases seamless even to the media provider.

The disclosed technique is directed to broadband network, which can be either wired or wireless, such as an HFC network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like. MPEG denotes a family of media (especially video and audio) decoding and multiplexing specifications where ISO/IEC 11172 is also called MPEG-1 and the ISO/IEC 13818 is also called MPEG-2.

The present invention provides a system and method in which layer 3 flow of data is transmitted downstream, in In-Band channels, using layer 2 In-Band, and upstream in the Out-Of-Band channel, using layer 2 Out-Of-Band.

Figure 1:
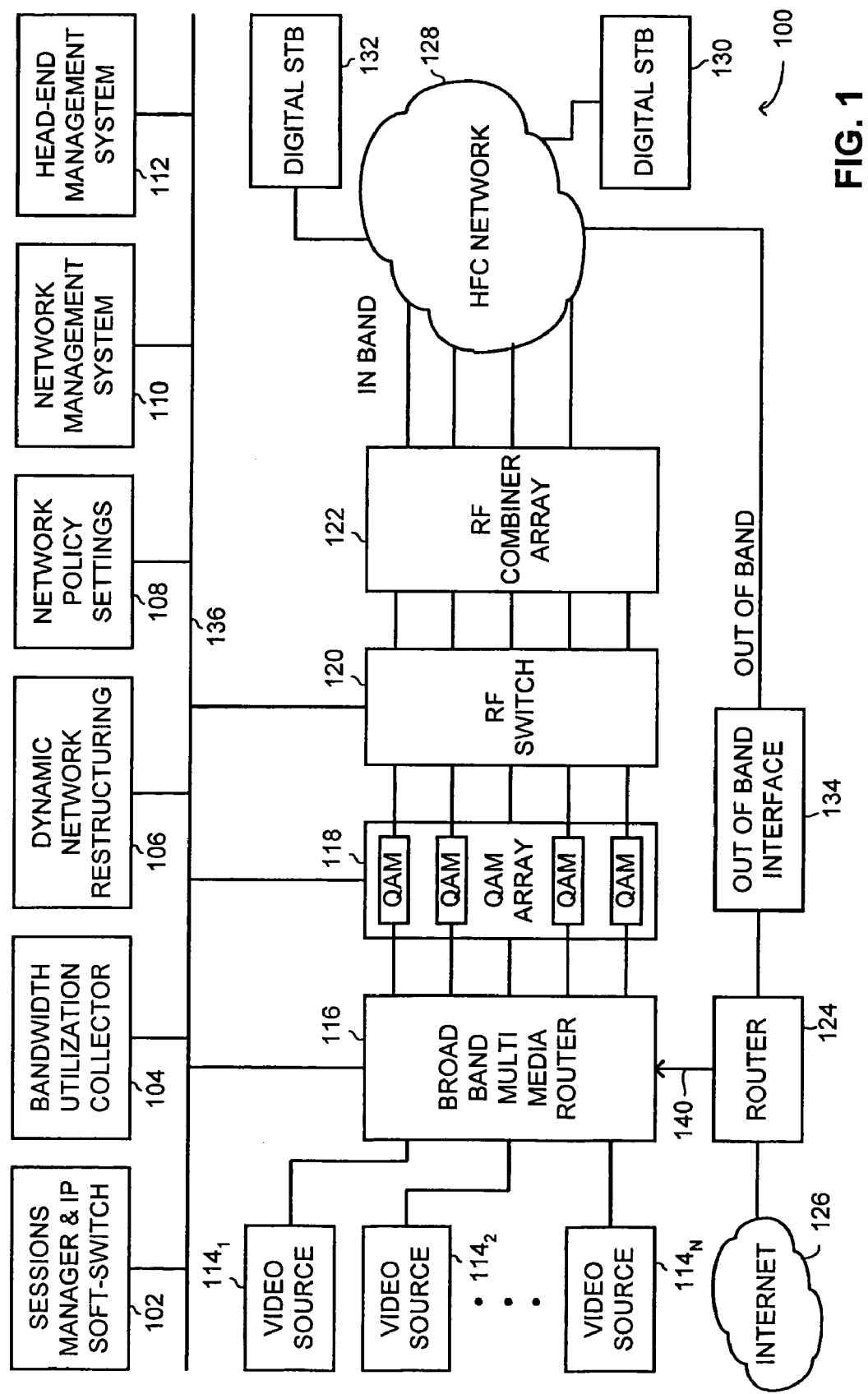
FIG. 1 is a schematic illustration of a broadband multimedia system, constructed and operative in accordance with a preferred embodiment of the present invention.

Reference is now made to FIG. 1, which is a schematic illustration of a broadband multimedia system, generally referenced 100, constructed and operative in accordance with a preferred embodiment of the present invention. System 100 includes a logical communication bus 136, a session manager and IP soft-switch unit 102, a bandwidth utilization collector 104, a dynamic network restructuring unit 106, a network policy settings unit 108, a network management system 110, and a head-end management system 112. System 100 further includes a plurality of media sources $114_1$, $114_2$ and $114_n$, a broadband multimedia router 116, a QAM array 118, an RF switch 120, a data router 124, an RF combiner array 122, an HFC network 128, a plurality of digital STBs 130 and 132, and an Out-Of-Band unit 134.

Session manager and IP soft-switch unit 102, bandwidth utilization collector 104, dynamic network restructuring unit 106, network policy settings unit 108, network management system 110, and head-end management system are connected to the logical communication bus 136. Broadband multimedia router 116 is connected to media sources $114_1$ $114_2$, and $114_n$, to logical communication bus 136, data router 124 and to QAM array 118. RF switch 120 is connected to logical communication bus 136, QAM array 118 and to RF combiner array 122. Data router 124 is connected to broadband multimedia router 116, to digital STBs 132 and 130 via Out-Of-Band unit 134 and HFC network 128, and to the Internet, generally designated 126. RF combiner array 122 is further connected to digital STBs 130 and 132, via HFC network 128.

The session management and the IP software switching are combined in the present example in a single module, which is the session manager and IP soft-switch unit 102. According to another preferred embodiment of the invention, (not shown) the session management and the IP software switching can be also implemented in two separate modules.

Session manager and IP soft-switch unit 102 receives and approves session requests, processes them and provides routing parameters to the broadband multimedia router 116. Broadband multimedia router 116 receives media streams from media source application $114_1$-$114_n$. It is noted that such media streams can include video streams, audio streams, data streams, individual data packets and the like. Such streams can be received over video channels, such as ones operative according to MPEG transport interfaces, or over data channels, such as TCP/IP Ethernet communication lines, which can further be received from Internet 126.

The routing parameters produced by session manager and IP soft-switch unit 102, specify input and output routing commands for broadband multimedia router 116, to operate there according. It is noted that a conventional MPEG transport stream does not include routing information such as destination or origin, rather just limited identification information, known as PID (Packet Identification). The disclosed technique overcomes this disadvantage as will be described in detail in conjunction with FIG. 4. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. The session manager and IP soft-switch 102 receives session initialization requests from a variety of media sources, such as application servers, end-users, and additional modules. The session manager and IP soft-switch 102, determines if these requests are compatible with each of a plurality of policy types and available resources, and determines whether or not to approve or deny these requests.

Session manager and IP soft-switch unit 102 utilizes bandwidth parameters stored in bandwidth utilization collector 104, regarding the current bandwidth utilization. The session manager and IP soft-switch 102 accesses network policy settings unit 108, to determine if a selected initialization request conforms to various network policies. A network policy can virtually include any condition, which applies to the content, type, source, destination, network, and the like, which are included in the session initialization request. For example, selected types of sessions are denied for a selected node, when the bandwidth usage at that node, exceeds a predetermined value. In another example, a network policy can include a condition, which does not allow X-rated movies to be transmitted to selected end users, at predetermined hours of the day. A further example for a network policy can include a condition where a selected source can only provide services to selected users, and not to others, and the like. The session manager further accesses network management system 110, for determining if there are malfunctions in selected parts of the network.

Broadband multimedia router 116 is connected to plurality of media sources $114_1$-$114_n$. Broadband multimedia router 116 directs data from these media sources to the appropriate output ports. QAM array 118 includes a plurality of QAM units, each receiving DVB/ASI media information and transmitting it modulated over an RF channel, connected thereto.

RF combiner array 122 includes a plurality of RF combiners (not shown), each operative to receive a plurality of RF channels and produce a single, multi-band RF signal, therefrom. The RF switch 120 is operative to route RF channels from each input port therein, to each other output port therein. Hence, RF switch 120 can connect each QAM of QAM array 118 to each RF combiner of RF combiner array 122, and thus, dynamically control network RF resources.

Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to HFC network 128. End user equipment, such as digital STBs 130 and 132, is connected to the system via HFC network 128, and is thus able to receive these transmissions. This direction is called downstream. Each of digital STBs 130 and 132 can include a simple set-top box, a cable modem, and the like. According to the present invention, end user equipment is also capable of transmitting data. This direction is called upstream. Digital STBs 130 and 132 communicate with data router 124 via the Out-Of-Band channel, using Out-Of-Band unit 134. Data router 124 directs packets received from digital STBs 130 and 132 to the Internet 126. Data router 124 further directs packets received from the Internet 126 to broadband multimedia router 116. In addition, data router 124 provides session requests received from either the Internet 126 or digital STBs 130 and 132, to session manager and IP soft-switch 102.

Figure 2:
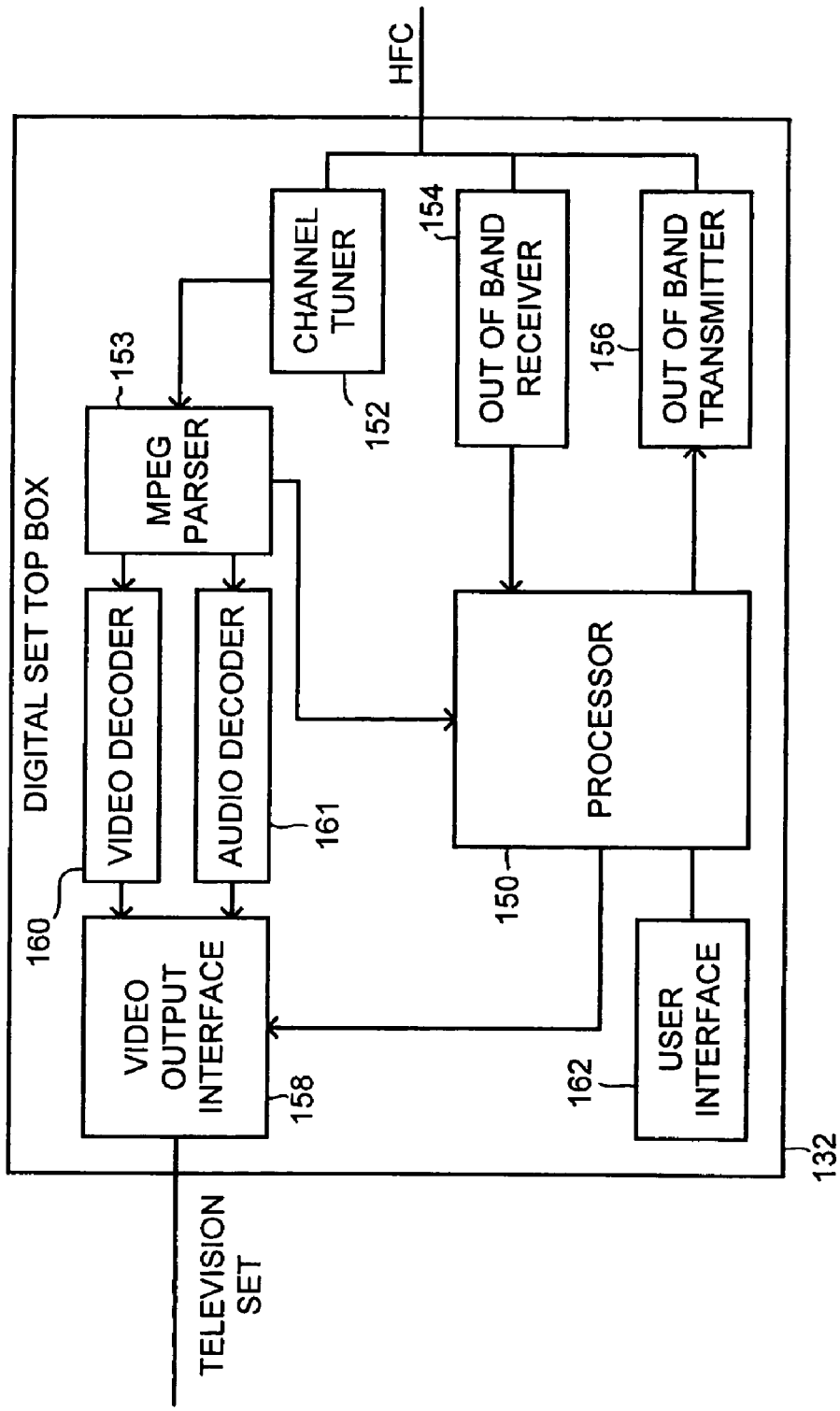
FIG. 2 is a schematic illustration of a digital set-top box.

Reference is further made to FIG. 2, which is a schematic illustration of a digital set-top box, generally referenced 150. Digital STB 132 includes a channel tuner 152, an MPEG parser 153, an Out-Of-Band receiver 154, an Out-Of-Band transmitter 156, a user interface 162, a processor 150, a video decoder 160, audio decoder 161 and a video output interface 158. MPEG parser 153, Out-Of-Band receiver 154, Out-Of-Band transmitter 156, user interface 162 and video output interface 158, are connected to processor 150. Video decoder 160 and audio decoder 161 are connected to MPEG parser 153 and to video output interface 158. Channel tuner 152, Out-Of-Band receiver 154 and Out-Of-Band transmitter 156 are further connected to the HFC. Channel tuner 152 is further connected to MPEG parser 153. Video output interface 158 is further connected to multimedia output unit such as a television set and may further be connected to an audio system (not shown).

Digital STB 132 receives elementary video and audio streams on MPEG transport in In-Band channels, via channel tuner 152. Channel tuner tunes into the selected In-Band channel and provides the signal thereof to MPEG parser 153. MPEG parser 153 distributes the elementary streams received in the channel between processor 150, video decoder 160 and audio decoder 161. It is noted that MPEG parser 153 distributes only elementary streams, which belong to a specific program number.

Video decoder 160 decodes the video elementary stream provided thereto and produces video output, to be provided to a television set via video output interface 158. Audio decoder 161 decodes the audio elementary stream provided thereto and produces audio output, to be provided either to a television set or to an audio system, via video output interface 158. According to the present invention, digital STB 132 further receives data over MPEG transport, in In-Band channels using MPEG transport with DSM-CC specification. MPEG parser 153 directs the MPEG transport data packets to processor 150, which in turn processes them and produces visual and audible signals. Processor 150 provides these video and audio signal to video output interface 158, which in turn provides them to the television set connected thereto. It is noted that the visual signal produced from the received data can be combined on screen with the video decoded from the video elementary stream.

User interface 162 receives commands from a user and provides them to processor 150. Processor 150 analyzes the user commands and may transmit data in the upstream direction using Out-Of-Band transmitter 156. It is noted that this upstream transmission is performed using QPSK.

Figure 3:
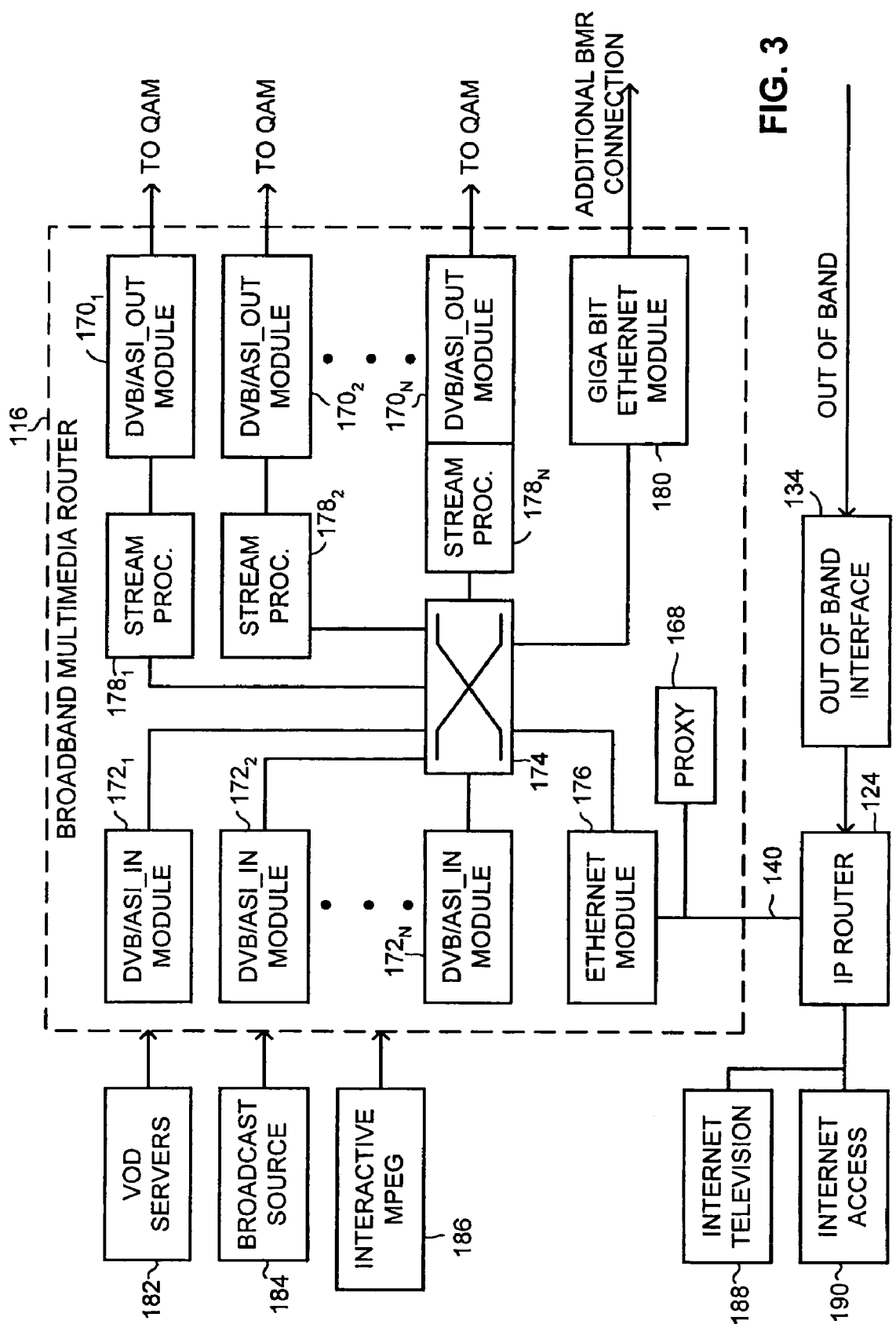
FIG. 3 is a schematic illustration in detail of the broadband multimedia router of the system of FIG. 1, constructed and operative in accordance with a further preferred embodiment of the invention.

Reference is now made to FIG. 3, which is a schematic illustration in detail of broadband multimedia router 116 of FIG. 1, constructed and operative in accordance with a further preferred embodiment of the invention. Broadband multimedia router 116 is operative to direct a variety of packet types, even when a packet does not include destination address information. According to the present invention, broadband multimedia router 116 makes sure that each entering data packet, which does not include destination information, is assigned such information, according to the session directing commands provided by the session manager and IP soft-switch unit 102.

Broadband multimedia router 116 is fed from a plurality of media sources such as VOD servers 182, music on demand unit 184, interactive MPEG unit 186, Internet television 188, Internet access 190 and the like. Broadband multimedia router 116 includes a plurality of DVB/ASI_IN modules $172_1$, $172_2$ and $172_N$, Ethernet module 176 (which can be either Gigabit Ethernet or Fast Ethernet module or both), a plurality of DVB/ASI_OUT modules $170_1$, $170_2$ and $170_N$, a plurality of stream processors $178_1$, $178_2$ and $178_N$, a proxy module 168, a Gigabit Ethernet module 180, and a core switch 174. It is noted that broadband multimedia router 116 further includes an internal controller and intermediate memory means (not shown), for operating and coordinating the various units thereof. Broadband multimedia router 116 can further include additional network adapters (not shown), which are operative to connect to various network types such as ATM, SONET, and the like.

Switch 174 is connected to DVB/ASI_IN modules $172_1$, $172_2$ and $172_N$, Ethernet module 176 and Gigabit Ethernet module 180. Switch 174 is further connected to DVB/ASI_OUT modules $170_1$, $170_2$ and $170_N$, via respective stream processors $178_1$, $178_2$ and $178_N$. Router 124 is further connected to proxy module 168 and to Ethernet module 176. Proxy module 168 is operative to respond to ARP requests and map IP addresses to MAC addresses.

DVB/ASI_IN modules $172_1$, $172_2$ and $172_N$ are input ports, which receive MPEG transport packets. It is noted that an MPEG transport packet encapsulating elementary media, includes a stream ID, also called PID. Stream processors $178_1$, $178_2$ and $178_N$ are operative to perform stream processing procedures such as multiplexing, re-multiplexing, rate adaptation, PID re-mapping, PCR re-stamping, updating system information embedded in transport streams, and the like. It is noted that stream processors 178 can be considered an integral part of broadband multimedia router 116.

The following is an example for a complex routing situation, which is performed by broadband multimedia router 116. DVB/ASI_IN module $172_1$ receives three media streams $S_1$, $S_2$ and $S_3$, having PIDs of 50, 100 and 200, respectively. Media streams $S_1$, $S_2$ and $S_3$ are to be directed to DVB/ASI_OUT modules $170_2$, $170_2$ and $170_1$, respectively. Substantially, at the same time, DVB/ASI_IN module $172_2$ receives four media streams $S_4$, $S_5$, $S_6$, and $S_7$, having PIDs of 100, 120, 200 and 300, respectively. Media streams $S_4$, $S_5$, $S_6$, and $S_7$ are to be directed to DVB/ASI_OUT modules $170_2$, $170_7$ (not shown), $170_1$ and $170_{23}$ (not shown), respectively.

In the present example, core switch 174 is a generic packet switching device and hence every packet provided thereto, has to be in a known addressable packet format. With respect to the media streams received at DVB/ASI_IN module $172_1$, broadband multimedia router 116 encapsulates a packet of media stream $S_1$, in an addressable packet, with destination information respective of the switch port, connected to DVB/ASI_OUT module $170_2$ and its original stream PID 50. Switch 174 directs the produced addressable packet to DVB/ASI_OUT module $170_2$, which opens the encapsulation, reconstructs the media stream packet, and assigns the stream PID provided by session manager and IP soft-switch unit 102. It is noted that session manager and IP soft-switch unit 102 can provide a stream PID, which is different from the original stream PID of the packet, as will be described herein below.

Broadband multimedia router 116 encapsulates a packet of media stream $S_2$, in an addressable packet, with destination information respective of the switch port connected to DVB/ASI_OUT module $170_2$ and its original PID 100. Broadband multimedia router 116 encapsulates a packet of media stream $S_3$, in an addressable packet, with destination information respective of the switch port connected to DVB/ASI_OUT module $170_1$ and its original PID 200.

With respect to the media streams received at DVB/ASI_IN module $172_2$, broadband multimedia router 116 encapsulates a packet of media stream $S_4$, in an addressable packet, with destination information respective of the switch port connected to DVB/ASI_OUT module $170_2$ but assigns a new PID 150, since PID 100 is already used for DVB/ASI_OUT module $170_2$, by media stream $S_2$. Here, switch 174 directs the produced addressable packet to DVB/ASI_OUT module $170_2$, which opens the encapsulation, reconstructs the media stream packet, and assigns the stream PID (150) provided by broadband multimedia router 116, which is different than the original stream PID (100). Similarly, broadband multimedia router 116 encapsulates a packet of media stream $S_6$, in an addressable packet, with destination information respective of the switch port connected to DVB/

ASI_OUT module 170₁ but with a new PID 100, since PID 200 is already used for DVB/ASI_OUT module 170₁ by media stream S₃. This procedure is called PID re-mapping.

Broadband multimedia router 116 encapsulates a packet of media streams S₅ and S₇, in addressable packets, with destination information respective of the switch port connected to DVB/ASI_OUT modules 170₇ and 170₂₃, with their respective original PIDs 120 and 300.

The above routing procedure is performed according to specific instruction provided by the session manager and IP soft-switch unit 102, for example, by means of a routing table. In case of an MPEG transport packet, broadband multimedia router 116 accesses the routing table according to the stream PID of that packet, and the DVB/ASI_IN module identification, which was received, and retrieves the predetermined destination associated therewith. It is noted that the predetermined destination is respective of the combination of the packet stream PID, and the respective DVB/ASI_IN module identification.

A data packet received from Ethernet module 176, is typically an addressable packet and hence already contains destination information. This data packet can be directed to a respective output port of the switch, according to that destination information. It is noted that session manager and IP soft-switch unit 102 can instruct broadband multimedia router 116, for example, by means of a routing table, to direct addressable packets to predetermined ports, which are set to be different but according to the destination information embedded in the packet.

Broadband multimedia router 116 is further operative to perform various stream processing procedures such as multiplexing, re-multiplexing, rate adaptation, PID re-mapping, PCR re-stamping (i.e., jitter reduction procedure by updating the program clock reference fields), updating system information embedded in transport streams, and the like. Such stream processing procedures are usually carried in an outgoing route of broadband multimedia router 116 (e.g., either in switch 174, in one of the output modules 170, 176 and 180, or in the route there between, by specific modules). In the present example, each of the DVB/ASI_OUT modules 170 is also operative to encapsulate other types of data in MPEG transport format, perform statistical multiplexing, and stream rate adaptation, to adapt the bandwidth and quality of the media stream to the available network resources.

Gigabit Ethernet module 180 is operative to connect broadband multimedia router 116 to another such broadband multimedia router. An Internet data session can be initiated either by the user or by an external request received from the Internet. Router 124 provides the session request to session manager and IP soft-switch unit 102, which determines if and how this session is to be executed. If the session is authorized, according to the various policies and the available resources, then session manager and IP soft-switch unit 102 allocates network resources. These network resources include for example an IP address for the digital STB, channel frequency in which the data session will be transmitted over the HFC 128, MPEG transport parameters such as PN and PID, and buffers within broadband multimedia router 116. Session manager and IP soft-switch unit 102 notifies broadband multimedia router 116, digital STB 132, the respective QAM in QAM array 118 and RF switch 120, as to the allocated resources, relevant to each of these units.

Broadband multimedia router 116 receives notification regarding the IP address, a selected DVB/ASI_OUT module 170 (i.e., which is connected to the QAM operating under the selected channel. In the present example DVB/ASI_OUT module 170₂ is selected), the PN and PID according to which the data is to be packetized and transmitted in MPEG transport, a selected Ethernet module 176 (in case where the broadband multimedia router 116 includes more than one), and the nature of the buffers which are to be allocated for that data session. In a case where the selected channel is not assigned to any QAM unit, then the session manager and IP soft-switch unit can further select an available QAM unit from QAM array 118, program it for the selected channel and operate RF switch 120 to direct that channel to the HFC network 128 node, which digital STB 132 is connected to, all this by means of dynamic network restructuring unit 106.

Digital STB 132 receives notification including the assigned IP address, the assigned In-Band channel and the PN and PID. Digital STB 132 can now transmit Out-Of-Band data packets with source address including the assigned IP. Digital STB 132 further tunes to the allocated In-Band channel and detects packets with the allocated PN and PID and provides them to processor 150.

In some cases, the digital STB 132 can already be tuned to a selected. In-Band channel (e.g., when the user indicates that he would like to view a selected video channel, having a predetermined PN). In that case, the selected channel is also assigned for the data session, which is run thereon, using the same PN but a different PID.

When the first data packets arrive from the Internet 126, router 124 sends an ARP request to proxy module 168, which includes the destination IP address (i.e., the IP address assigned for the digital STB 132). Proxy module 168 responds with the MAC address of the Ethernet interface assigned for this data session, which in the present example is Ethernet module 176. Router 124 then directs all of the packets received for that IP address to Ethernet module 176. Core switch 174 directs the received packets to the selected DVB/ASI_OUT modules 170₂, via the respective stream processor 178₂. Stream processor 178₂ performs a number of operations on the data packets, such as multiplexing, re-multiplexing, rate adaptation, converting data packets to MPEG transport packets, PID re-mapping, PCR re-stamping, updating system information embedded in transport streams.

For example, rate adaptation is performed in the following situations. The present invention uses the DSM-CC specification for further transmitting the packets to the destination digital STB. It is noted that the DSM-CC specification is characterized by limited bandwidth capacity, which may further be limited by the performance of the digital STB 132 (FIG. 2). Data communication such as IP is not limited in bandwidth and may very well overload the processor of digital STB 132. The present invention overcomes this disadvantage by providing a method which controls the rate in which data is transmitted to the digital STB 132, over the In-Band channel according to the selected communication specification, as will described further below.

After stream processor 178₂ processed the packets, DVB/ASI_OUT modules 170₂ converts them into MPEG transport packets with the allocated PN and PID, and provides the MPEG transport packets to the QAM unit (not shown) connected thereto. The QAM unit combines all of the MPEG transport packets (of different PNs) received therein and modulates them on the selected physical RF channel, which is then directed to the digital STB 132 via HFC network 128 (FIG. 1).

Figure 4:
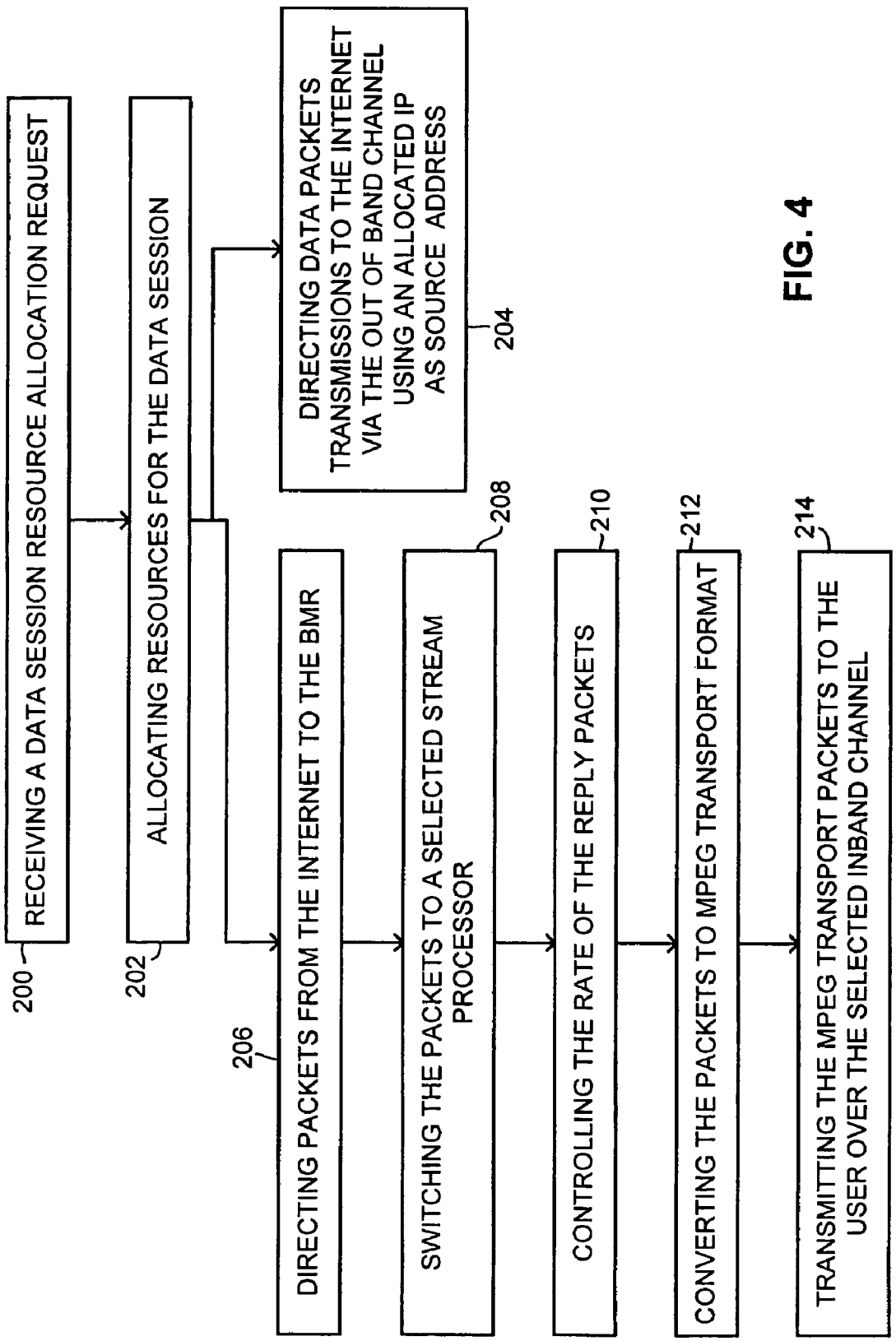
FIG. 4 is a schematic illustration of a method for operating the system of FIG. 1, in separate layer 2 data communication links, operative in accordance with a further preferred embodiment of the present invention.

Reference is now made to FIG. 4, which is a schematic illustration of a method for operating system 100 of FIG. 1, in separate layer 2 data communication links, operative in accordance with a further preferred embodiment of the present invention. In step 200, a data session resource allocation request is received. With reference to FIG. 3, session manager and IP soft-switch unit 102 receives a data session resource allocation request, either from a digital STB (i.e., the end-user) or from an external source such as the Internet. It is noted that such an external source can also for example be a video server located at the head-end which runs data sessions which are associated with video sessions, provided thereby.

In step 202, when the data session is approved, resources are allocated therefor. These resources include an IP address for the destination digital STB, In-Band channel frequency, PN and PID, as well as buffers in the broadband multimedia router. With reference to FIG. 3, session manager and IP soft-switch unit 102 allocates these resources and notifies the respective units which are to use these resources, such as the broadband multimedia router 116, the digital STB and as an option modify QAM and RF routing settings.

In step 204, the data packet transmissions are directed from the Out-Of-Band channel to the Internet. These data packet transmissions are originated by the digital STB and include the assigned IP address as a source IP address. With reference to FIG. 3, router 124 directs data packets, received from the Out-Of-Band interface 134 (produced by digital STB 132) to the Internet 126 (FIG. 1), via Internet access module 190.

In step 206, packets received from the Internet are directed according to the destination IP address, embedded therein. This destination IP address is the IP address assigned for the destination digital STB. With reference to FIG. 3, router 124 directs data packets according to the destination IP address embedded therein. When the router 124 is able to map the IP address to a MAC address, it directs the data addresses to the communication interface associated with that MAC address. Otherwise, router 124 sends an ARP request to proxy 168, which replies with the correct MAC address. In the present example, the MAC address is of digital STB 132.

In step 208, the data packets are switched to a selected stream processor. With reference to FIG. 3, core switch 174 switches the data packets received from Ethernet module 176, having a specific IP&MAC address to a selected stream processor $178_2$. It is noted that other data packets received from Ethernet module 176, having different IP&MAC addresses might be switched to other stream processors 172, according to the switching table and resources allocated therefor.

In step 210, the rate of the data packets is controlled. With reference to FIG. 3, stream processor controls the rate of the data packet so that it remains within a predetermined range or does not exceed a predetermined threshold. This aspect of the invention will be described in further detail in FIGS. 8 and 9.

In step 212, the data packets are converted to MPEG transport format. With reference to FIG. 3, DVB/ASI_OUT modules $170_2$ converts the data packets to MPEG transport format and provides them to the QAM module connected thereto.

In step 214, the MPEG transport packets are transmitted to the user over the selected In-Band channel. With reference to FIG. 1, the selected QAM unit, according to the channel allocated for the data session, transmits the packets over the In-Band channel, via the HFC network 128 to the destination digital STB 132.

Figure 5A:
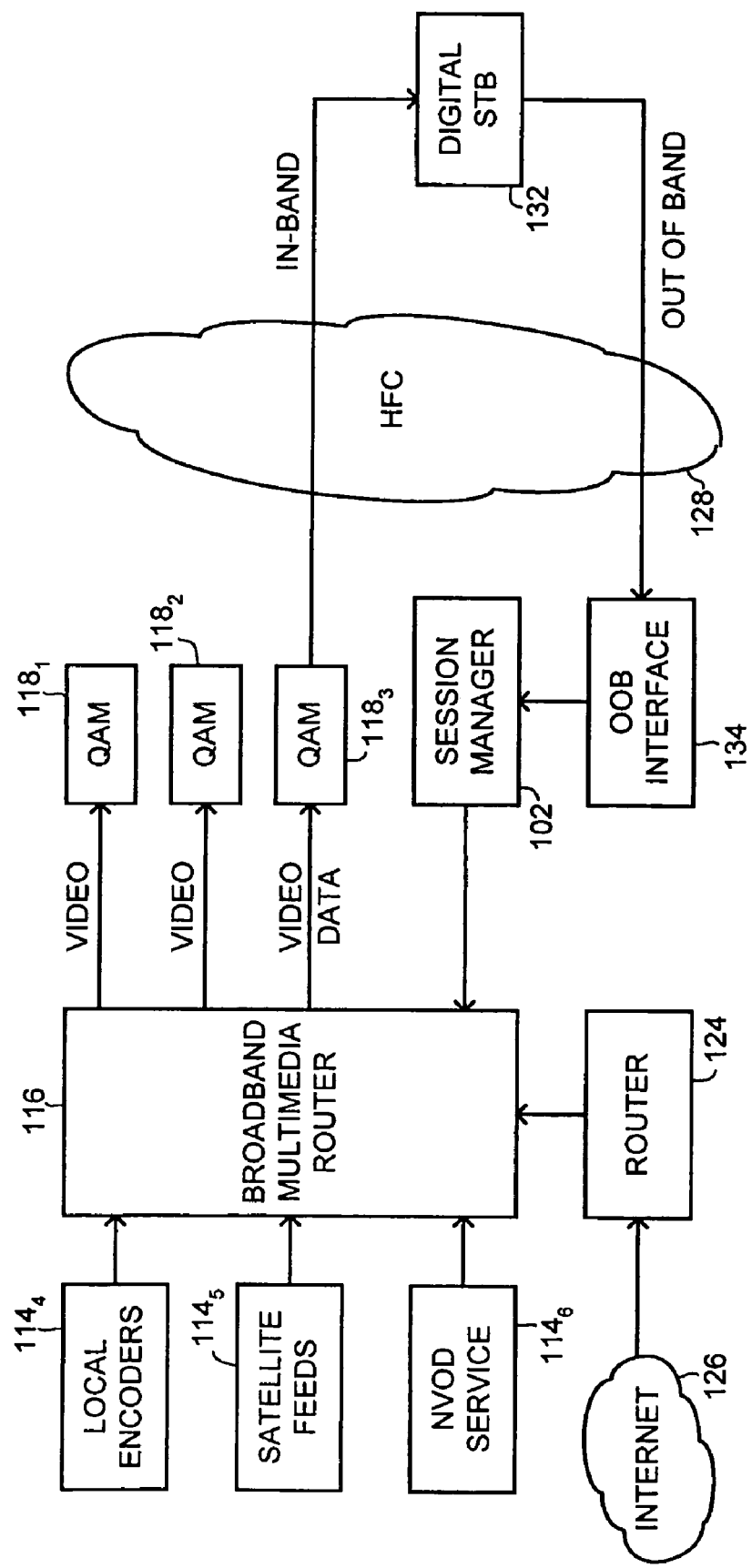
FIG. 5A is a schematic illustration of parts of the system of FIG. 1, demonstrating the initial stage in a dynamic user channel selection situation, operative in accordance with another preferred embodiment of the present invention.
Figure 5B:
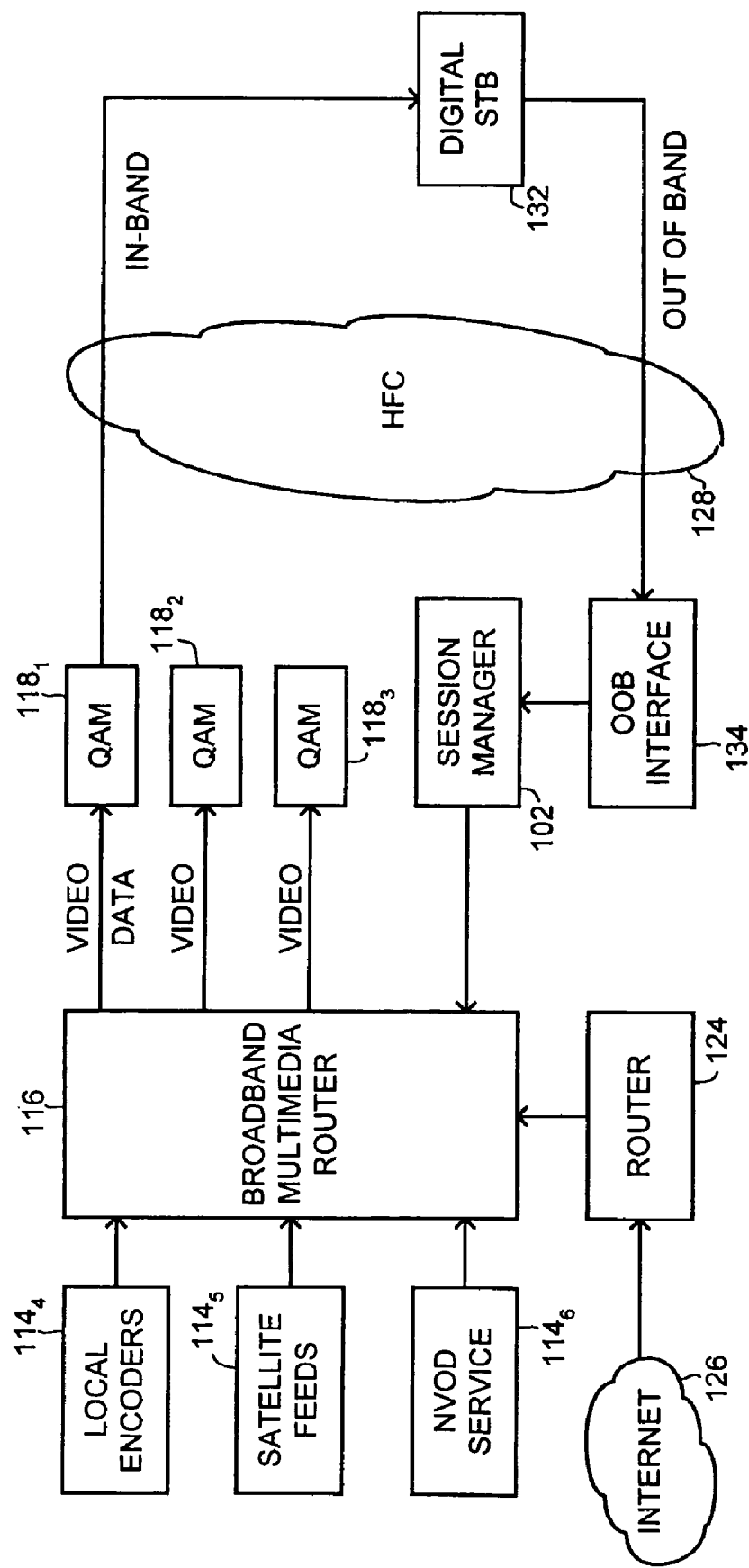
FIG. 5B is a schematic illustration of parts of the system of FIG. 1, demonstrating the final stage in a dynamic user channel selection situation.

According to another aspect of the present invention includes the, system dynamically adapts the network resources allocated for the data session. Reference is now made to FIGS. 5A and 5B. FIG. 5A is a schematic illustration of parts of the system of FIG. 1, demonstrating the initial stage in a dynamic user channel selection situation, operative in accordance with another preferred embodiment of the present invention. FIG. 5B is a schematic illustration of parts of the system of FIG. 1, demonstrating the final stage in a dynamic user channel selection situation.

In the example set forth in FIGS. 5A and 5B, the broadband multimedia router 116 is connected to a plurality of video sources such as local encoders $114_4$, satellite feeds $114_5$, and an NVOD service $114_6$.

When the user switches to another channel, (e.g., the user "zaps" between different television channels, which are oriented at different QAM units—then the channel tuner 152 is required to tune to different frequency), the digital STB of that user notifies the session manager unit 102 via the Out-Of-Band channel (and Out-Of-Band interface 134). In the present example, the viewer's STB tunes from a channel provided by QAM $118_3$ (FIG. 5A) to a channel provided by QAM $118_1$ (FIG. 5B).

The session manager unit 102 dynamically reallocates the channel of the newly selected QAM for the data session and so the data session "follows" the video selection of the user. This reallocation can further include reallocation of a PN according to the user selected television channel PN and a new PID, when the old data session PID is already occupied in the newly selected QAM and cannot be further used for the data session. Accordingly, the broadband multimedia router 116 directs data packets with a destination MAC address of the digital STB, to the DVB/ASI_OUT modules 170 (FIG. 3), which is connected to the newly selected QAM. It is important to note that this process is seamless to the network unit which transmitted the data packets to the digital STB and substantially seamless to the digital STB it self, which only has to provide notification that it switched to a different channel.

Figure 6:
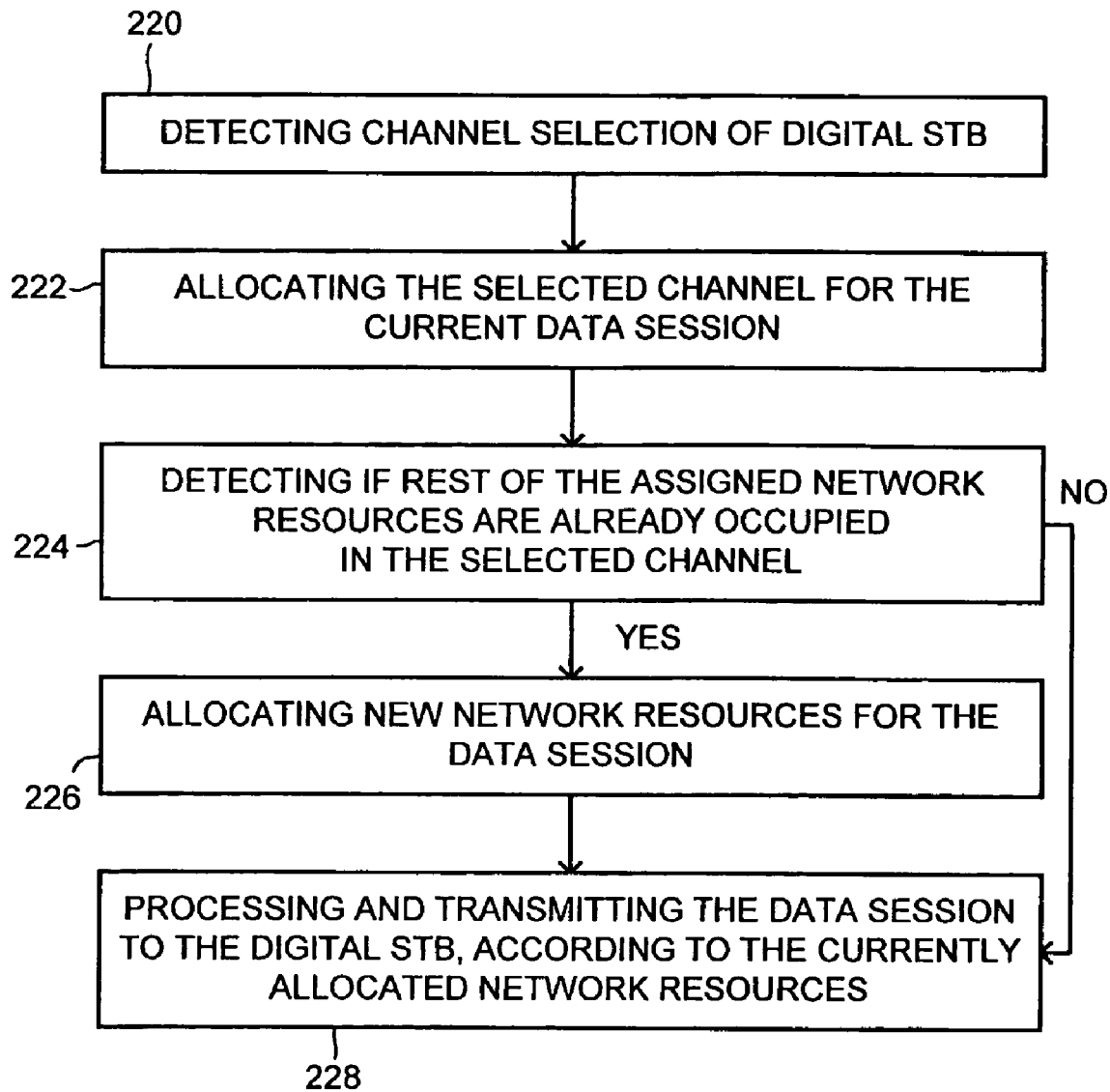
FIG. 6 is a schematic illustration of a method for dynamically allocating resources for a data session, processed by the system of FIG. 1, operative in accordance with a further preferred embodiment of the present invention.

Reference is now made to FIG. 6, which is a schematic illustration of a method for dynamically allocating resources for a data session, processed by system 100 of FIG. 1, operative in accordance with a further preferred embodiment of the present invention.

In step 220, a channel selection of a digital STB is detected. It is noted that the selected channel is different than the one, which the digital STB was tuned to, until the selection. With reference to FIG. 3, Out-Of-Band interface 134 detects a channel selection notification received from digital STB 132 and provides that notification to the session manager and IP soft-switch unit 102.

In step 222, the selected channel is allocated for the current data session. It is noted that previous channel which the digital STB was tuned to was the one allocated for the data session. With reference to FIG. 1, either session manager and IP soft-switch unit 102 or broadband multimedia router 116 allocate that selected channel for the current data session. It is noted that more than one data sessions can run at the same time for a plurality of digital STBs, using the same PID. Each digital STB is operative to detect the packets, which are associated therewith, in the received elementary stream of that PID.

In step 224, the remaining network resources (i.e., PN, PID and the like) which or originally allocated for the data session are detected to see if they are already occupied in the selected channel. When these resources are indeed occupied, then the system allocates new network resources for the data session (step 226).

In step 228, the data packets of the data session are processed and transmitted to the destination digital STB, according to the currently allocated network resources.

Figure 7:
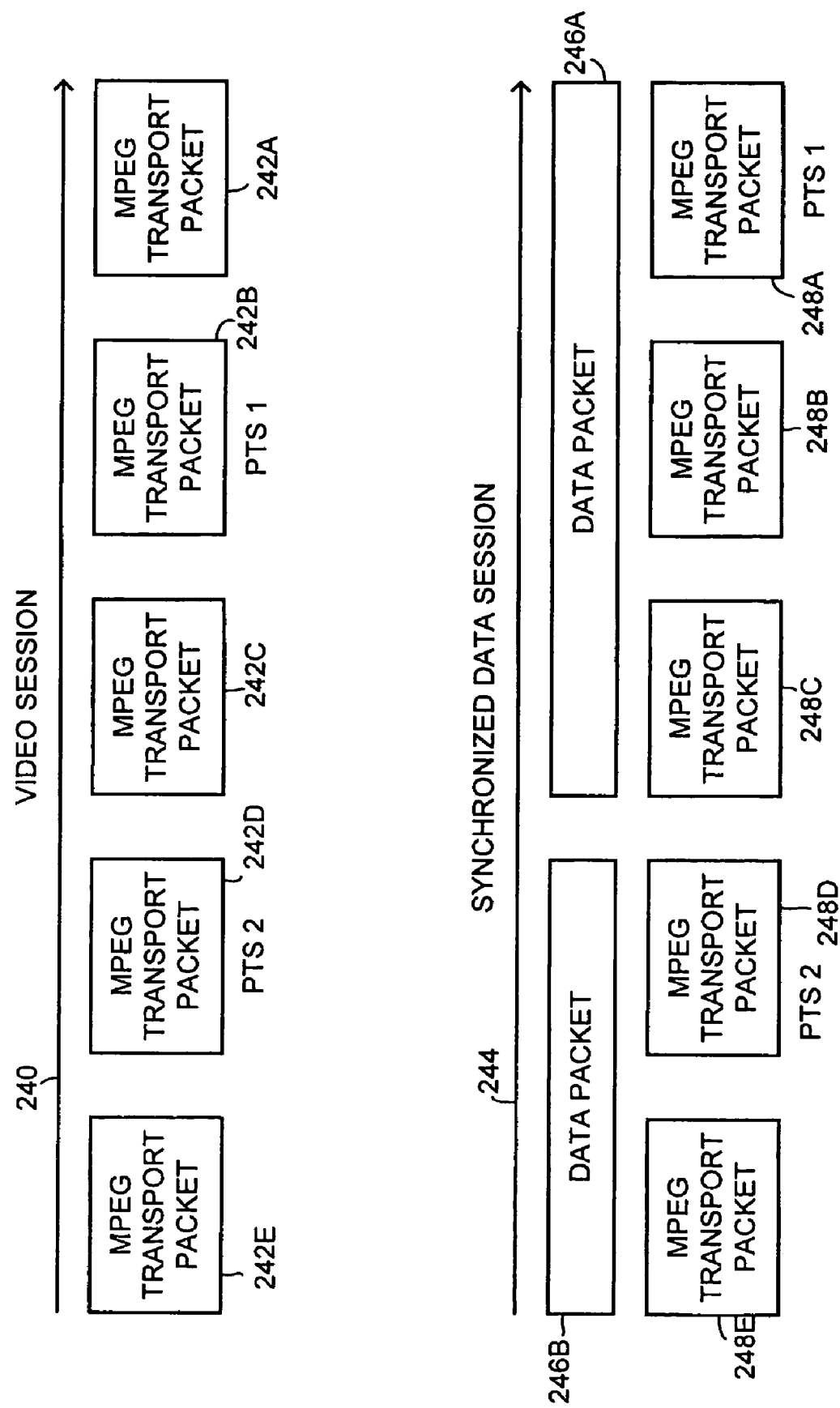
FIG. 7 is a schematic illustration of a video session and a data session, which are synchronized, according to another preferred embodiment of the present invention.

According to another aspect of the present invention, a data session is synchronized with another session (e.g., a video or audio session or elementary stream). Reference is now made to FIG. 7, which is a schematic illustration of a video session, generally referenced 240 and a data session, generally referenced 244, which are synchronized, according to another preferred embodiment of the present invention. Video session 240 is represented by MPEG transport packets 242A, 242B, 242C, 242D and 242E. Data session 244 includes a plurality of data packets such as data packets 246A and 246B. Data packet 246A is sliced and converted to MPEG transport format as MPEG transport packets 248A, 248B and 248C. Data packet 246B is sliced and converted to MPEG transport format as MPEG transport packets 248D and 248E.

MPEG transport packet 242B is assigned a presentation time stamp PTS1 and MPEG transport packet 242D is assigned a presentation time stamp PTS2. This indicates that MPEG transport packet 242B and 242D are to be presented on the display at respective points in time indicated by PTS1 and PTS2. According to the present invention, the MPEG transport packets 248, of the data session 244 can also be assigned presentation time stamps so data is transmitted in accurate timing with a specific video stream. In the present example, MPEG transport packet 248B is assigned a presentation time stamp PTS1 and MPEG transport packet 248D is assigned a presentation time stamp PTS2. This indicates that MPEG transport packet 248B and 248D are to be presented on the display at respective points in time indicated by PTS1 and PTS2, which are respectively the same for MPEG transport packet 242B and 242D.

As noted above, the MPEG transport transmission rate of the data session may need to be controlled. Taking the video transmitting capability and the data transmitting capabilities and combining them together produces converged application. The bandwidth traffic patterns that may exist in a channel include:

Constant bit rate (CBR), which is a continuous stream of bits at a steady rate characterizes Traffic, Variable bit rate (VBR), which has a burst like nature, where end-to-end delay is critical, and can be characterized by voice or video applications, and Available Bit Rate (ABR) and Unspecified Bit Rate (UBR). ABR and UBR are utilized for burst like LAN traffic and data that is more tolerant of delays. UBR is a "best effort" service that does not specify bit rate or traffic parameters and has no quality of service guarantees. ABR, like UBR, is also a best effort service, but differs in that it is a managed service, based on minimum and/or maximum bandwidth allocation.

Video cannot tolerate lost or delay of packets. Hence, the most suitable ways to transmit it are either using CBR or VBR bandwidth allocation methods. ABR or UBR bandwidth allocation methods are commonly used for data transmission. Data applications can usually tolerate longer delay and can use retransmission method (e.g. TCP) to overcome packet lose.

According to the invention, the total potential bandwidth on each channel is divided between the video sessions and the data sessions. Most of the capacity of the channel is preserved for the video CBR or VBR transmission. When using CBR, then the allocated bandwidth is simply the sum of the entire CBR stream. When using VBR, then the allocated bandwidth is the maximum allowed to all the VBR streams, using rate adaptation or similar techniques. A relatively small fraction of the bandwidth is reserved for the data transmission, although more bandwidth can be allocate for the data based on momentarily availability due to the face that not all of the allocated bandwidth is utilized at any given moment. The data streams can make a use of the extra bandwidth when it is available to increase the performance, but can still function when the bandwidth availability decreases to the minimum.

The above control stage (i.e., session management and resource allocation) and transmission stage, were discussed separately, for each transmission types (i.e., data transmission and video transmission). The following description addresses the control and transmission stages regarding both of the transmission types. In the control stage the two-transmission types can be served on independent times, meaning both together, or it can be first the video and then the data (or the other way around). Where one session (video or data) already exists, it has a PN and at least one PID. According to MPEG transport specification the PN is recorded in the program association table (PAT) and a program mapping table is allocated for that session including all of the PIDs associated therewith.

When initiating a second session, while the first session still runs, the same PN can be allocated for that second session with a different PID. According to this procedure, the second session PIDs are added to the program-mapping table (PMT) of the first session. The session manager and IP soft-switch unit 102 does not have to start the process of creating authorizing and allocating resources for the second session. Thus, the initiation of the second session need not be completed, rather it is combined into the first session.

Conventional digital STBs, such as digital STB 150 of FIG. 2, include a single downstream receiver (tuner) and a single video decoder and a single audio decoder, and hence are operative to produce video & audio signals for a single program only. Such digital STBs do not provide picture-in-picture (PIP) capabilities since these require at least an additional decoder for the second program and where the second program is provided in a different In-Band channel, also an additional downstream receiver is required, for the case that the PIP program is transmitted in different frequencies The technique disclosed above overcomes this disadvantage by transmitting a small-scale bit map of the second program, in an In-Band data session. With reference to FIG. 2, the MPEG parser 153 provides the data elementary stream to processor 150 and the video elementary stream to the video decoder 160. The video decoder 160 decodes the video elementary stream and produces a video image. The processor 150 processes the data elementary stream, extracts the bit-map embedded therein and provides it as overlay image on top of the video image, via video output interface, thereby producing a picture-in-picture effect. It is noted that such as overlay can also be made semi transparent where portions of the background image are partially seen through the overlaid image.

An MPEG transport program typically requires around four Mega-bits per second bandwidth, and according to the invention can include a single data session. Hence, the digital STB can be provided with around four Mega-bit per second bandwidth of downstream data. Regarding the data application, depending on the source server and the bandwidth of the Internet rout to the broadband multimedia router 116, the data bit-rate can even exceed that number. In addition, a significant number of the digital STBs, which have been installed in households around the world, include a very weak processor, which cannot process more than a few kilo-bits per second. When too much data is provided to the processor of the digital STB, it may overflow, which cause an inefficient use of bandwidth and also might cause a malfunction of the digital STB.

Figure 8:
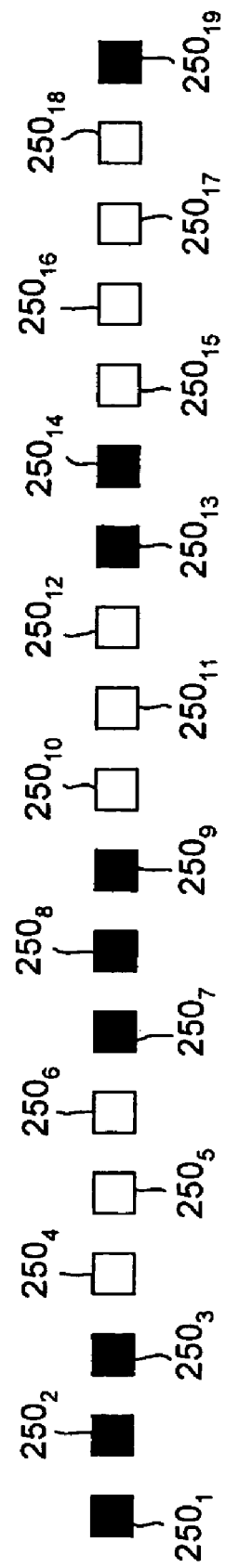
FIG. 8 is a schematic illustration of a data session transmission timing sequence, operative in accordance with a further preferred embodiment of the present invention.

The present invention overcomes this disadvantage by providing a novel method for controlling the data transmission rate to the digital STB. Reference is now made to FIG. 8, which is a schematic illustration of a data session transmission timing sequence. The timing sequence includes a plurality of time slots $250_1$, $250_2$, $250_3$, $250_4$, $250_5$, $250_6$, $250_7$, $250_8$, $250_9$, $250_{10}$, $250_{11}$, $250_{12}$, $250_{13}$, $250_{14}$, $250_{15}$, $250_{16}$, $250_{17}$, $250_{18}$ and $250_{19}$. According to the method of the invention, data session MPEG transport packets are transmitted only in some of the time slots and not all of the time. In the present example, the black filled rectangles represent time slots in which a data session MPEG transport packet was transmitted, while the white filled rectangles represent time slots in which no data session MPEG transport packet was transmitted. However, it is noted that other data sessions can make use of these empty time slots, since they are not directed to the same digital STB and hence do not add to the load of the digital STB associated with the current session.

Figure 9:
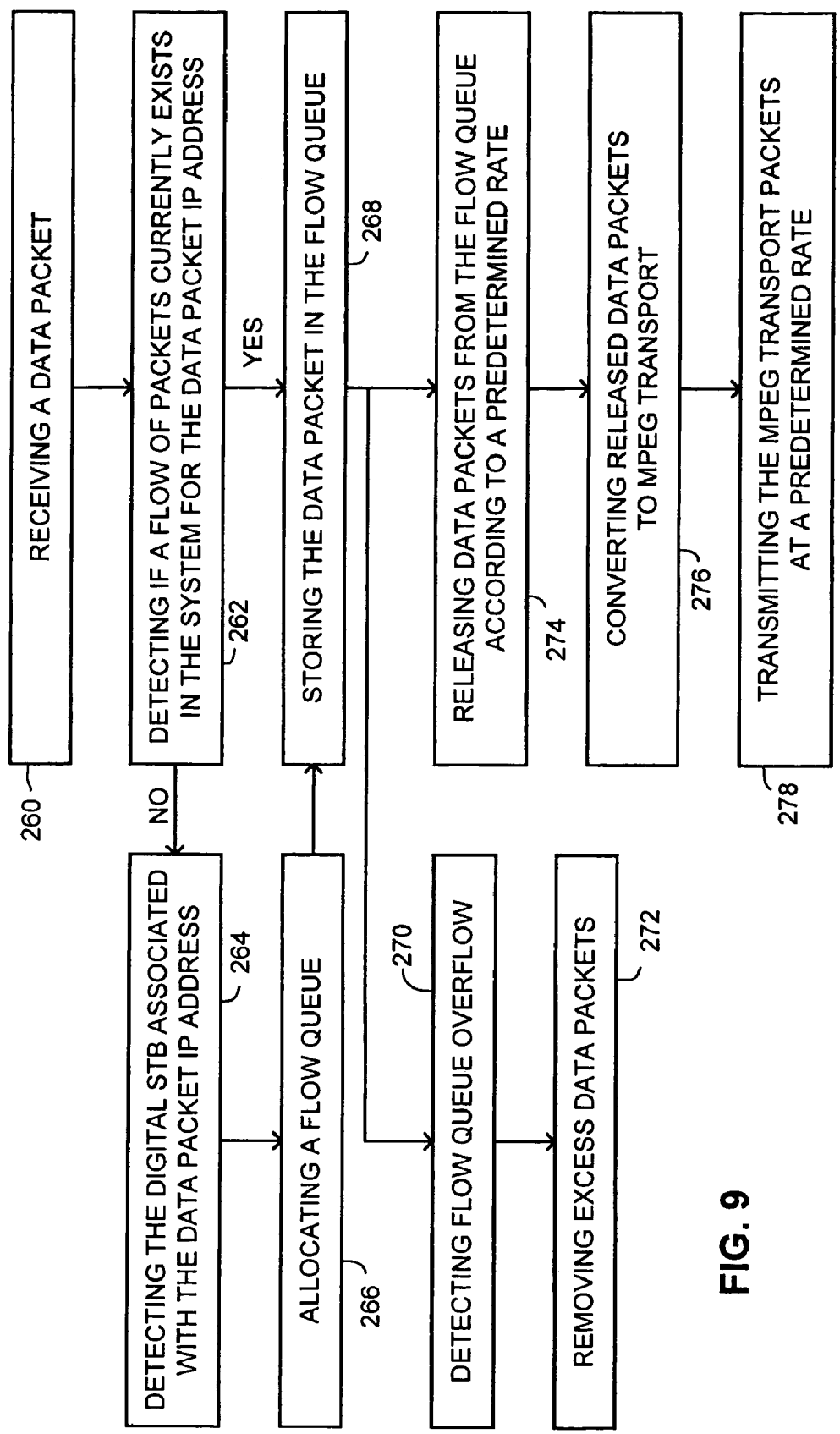
FIG. 9 is a schematic illustration of a method for controlling data session MPEG transport packet transmission rate, operative in accordance with another preferred embodiment of the present invention.

Reference is further made to FIG. 9, which is a schematic illustration of a method for controlling data session MPEG transport packet transmission rate, operative in accordance with another preferred embodiment of the present invention.

In step 260, a data packet is received. With reference to FIG. 3, a data packet provided from the Internet is routed and switched until it is provided to stream processor $178_2$.

In step 262, the existence of a flow of packets, associated with the received packet, is detected, according to the destination IP address of the data packet. The indication for the existence of such a flow is presence of a flow queue associated with the destination IP address of the data packet. When such a flow does not exist, then the digital STB associate with the data address is detected according to the destination packet IP (step 264) and a flow queue is allocated (step 266) thereby, creating a flow for the received data packet.

In step 268, the data packet is stored in the queue flow and released therefrom in a predetermined rate (step 274) which is intended not to exceed the capacity of the weakest link in the communication chain to the digital STB (i.e., the set top box processor in most cases). When the average packet release rate is lower than the average packet arrival rate, then the flow queue may overflow. When such a situation is detected (step 270) excess data packets are removed (step 272). It is noted that conventional layer 4 communication protocols such as TCP include mechanisms can rectify and recover from such a malfunction.

In step 276 the released data packets are converted to MPEG transport. In step 278, each of the MPEG transport packets is assigned a time slot according to a partial transmission timing scheme such as the one provided in FIG. 8, and is transmitted to the digital STB.

It will be appreciated by persons skilled in the art that the present invention is not limited to what has been particularly shown and described hereinabove. Rather the scope of the present invention is defined only by the claims, which follow.

The invention claimed is:

1. A broadband multimedia system, comprising: a broadband multimedia router communicatively connected to a data router and between a plurality of media sources and a plurality of network transmitters, and configured to encapsulate packets of video streams received from said media sources within addressable packets for switching between inputs and outputs of said broadband multimedia router; and a session manager, communicatively connected to said broad band multimedia router and configured to provide routing instructions to said broadband multimedia router for (i) directing said video streams received from said media sources to said network transmitters for transmitting over a broadband network and (ii) directing addressable data packets received from said data router to at least a selected one of said network transmitters for transmitting over said broadband network to a specific destination associated with address information included in said addressable data packets; wherein the session manager is further adapted to dynamically reallocate a channel of a newly selected network transmitter for directing addressable data packets to the specific destination so that a data session with the specific destination follows a video selection of a user.

2. The broadband multimedia system according to claim 1, wherein said session manager is further configured to receive data session requests, authorize data sessions in response thereto and allocate network resources for said data sessions.

3. The broadband multimedia system according to claim 2, wherein said session manager is further configured to assign a layer three address to a digital STB communicatively connected to said broadband multimedia system via said broadband network.

4. The broadband multimedia system according to claim 2, wherein said session manager is further configured to assign a network channel layer three address to a digital STB communicatively connected to said broadband multimedia system via said broadband network.

5. The broadband multimedia system according to claim 1, wherein the broadband multimedia router is communicatively connected between the plurality of media sources and a plurality of quadrature amplitude modulation units of a quadrature amplitude modulation array, wherein the plurality of the quadrature amplitude modulation units is the plurality of the network transmitters.

6. The broadband multimedia system according to claim 1, wherein the session manager is further adapted to dynamically reallocate the channel of the newly selected network transmitter in response to a notification received from a set top box of the user over an out-of-band channel.

* * * * *